(12) United States Patent
Yuasa et al.

(10) Patent No.: US 10,263,539 B2
(45) Date of Patent: Apr. 16, 2019

(54) POWER CONVERTER AND AIR-CONDITIONING APPARATUS USING THE SAME

(71) Applicant: Mitsubishi Electric Corporation, Tokyo (JP)

(72) Inventors: Kenta Yuasa, Tokyo (JP); Shuta Ishikawa, Tokyo (JP); Akihiro Tsumura, Tokyo (JP); Shinsaku Kusube, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/764,008

(22) PCT Filed: Oct. 1, 2015

(86) PCT No.: PCT/JP2015/077978
§ 371 (c)(1),
(2) Date: Mar. 28, 2018

(87) PCT Pub. No.: WO2017/156298
PCT Pub. Date: Apr. 6, 2017

(65) Prior Publication Data
US 2018/0287490 A1 Oct. 4, 2018

(51) Int. Cl.
*H02M 7/537* (2006.01)
*H02M 3/155* (2006.01)
(Continued)

(52) U.S. Cl.
CPC ............. *H02M 7/537* (2013.01); *F25B 31/02* (2013.01); *H02M 1/08* (2013.01); *H02M 3/155* (2013.01);
(Continued)

(58) Field of Classification Search
CPC .......... H02M 1/08; H02M 1/32; H02M 3/155; H02M 7/06; H02M 2001/0009
See application file for complete search history.

(56) References Cited

U.S. PATENT DOCUMENTS 4,729,082 A * 3/1988 Sato .................... H02M 1/4233
363/41
5,483,435 A * 1/1996 Uchino .................... H02P 9/48
363/127
(Continued)

FOREIGN PATENT DOCUMENTS

JP 2010-187521 A 8/2010

OTHER PUBLICATIONS

International Search Report of the International Searching Authority dated Dec. 8, 2015 for the corresponding International application No. PCT/JP2015/077978 (and English translation).

*Primary Examiner* — Yusef A Ahmed
(74) *Attorney, Agent, or Firm* — Posz Law Group, PLC (57) ABSTRACT

A power converter includes a transformation circuit configured to transform a rectified voltage, and a converter control unit configured to control a switching element of the transformation circuit. The converter control unit calculates a current command value based on a line voltage or the phase voltage, calculates a current deviation between the current command value and the reactor current, and calculates a switching command value from the current deviation. The converter control unit includes a plurality of integrators for the respective different phase angles of a power supply voltage. The integrator corresponding to a power supply phase angle is caused to accumulate the current deviation, and the integrator corresponding to a phase angle that is advanced by a set delay phase from the power supply phase angle is caused to output the control amount. A switching (Continued)

signal is generated with use of the control amount and the switching command value.

11 Claims, 8 Drawing Sheets

(51) Int. Cl.
  *H02M 7/06*     (2006.01)
  *F25B 31/02*     (2006.01)
  *H02M 1/08*     (2006.01)
  *H02P 27/06*     (2006.01)
  *H02M 1/00*     (2006.01)

(52) U.S. Cl.
  CPC .............. *H02M 7/06* (2013.01); *H02P 27/06* (2013.01); *F25B 2600/021* (2013.01); *H02M 2001/0009* (2013.01)

(56) References Cited

U.S. PATENT DOCUMENTS

| | | | |
|---|---|---|---|
| 6,320,772 B1* | 11/2001 | Doyama | H02M 1/4208 363/127 |
| 8,681,515 B2* | 3/2014 | Bae | H02H 3/38 363/36 |
| 9,077,278 B2* | 7/2015 | Omata | H02P 21/22 |
| 9,735,666 B2* | 8/2017 | Shimomugi | H02M 1/32 |
| 2004/0232863 A1* | 11/2004 | Takahashi | H02M 1/425 318/432 |
| 2005/0073280 A1* | 4/2005 | Yoshinaga | H02J 3/01 318/727 |
| 2007/0223261 A1* | 9/2007 | Fujii | H02M 7/757 363/55 |
| 2010/0213769 A1* | 8/2010 | Sakakibara | H02M 5/297 307/82 |
| 2011/0130889 A1* | 6/2011 | Khajehoddin | H02J 3/383 700/298 |
| 2011/0211375 A1* | 9/2011 | Uno | H02M 1/4225 363/74 |
| 2011/0227522 A1* | 9/2011 | Shinomoto | H02M 1/4225 318/400.29 |
| 2013/0063058 A1* | 3/2013 | Shouji | H02M 7/53875 318/400.06 |
| 2015/0256095 A1* | 9/2015 | Ohta | H02M 7/4826 363/37 |
| 2016/0006345 A1* | 1/2016 | Yoshinaga | H02M 1/126 318/400.26 |
| 2016/0126854 A1* | 5/2016 | Yuasa | H02P 27/06 62/508 |
| 2016/0233782 A1* | 8/2016 | Sakakibara | H02M 1/4225 |
| 2016/0248365 A1* | 8/2016 | Ishizeki | H02M 1/36 |
| 2017/0077829 A1* | 3/2017 | Taniguchi | H02P 23/26 |
| 2017/0153051 A1* | 6/2017 | Hatakeyama | F25B 49/02 |
| 2017/0201186 A1* | 7/2017 | Yuasa | H02M 3/158 |
| 2017/0366082 A1* | 12/2017 | Liu | H02P 7/04 |

* cited by examiner

POWER CONVERTER AND AIR-CONDITIONING APPARATUS USING THE SAME

CROSS REFERENCE TO RELATED APPLICATION

This application is a U.S. national stage application of International Application No. PCT/JP2015/077978, filed on Oct. 1, 2015, the contents of which are incorporated herein by reference.

TECHNICAL FIELD

The present invention relates to a power converter configured to rectify AC power and then transform the rectified AC power with use of a transformation circuit including a switching element, and to an air-conditioning apparatus using the power converter.

BACKGROUND

In a large-capacity inverter device configured to drive a motor for a compressor or a fan of a refrigerating and air-conditioning apparatus, a three-phase full-wave rectification type converter includes a three-phase rectifier configured to rectify a three-phase AC voltage, a smoothing capacitor including a reactor and a capacitor and being configured to smooth an output voltage of the three-phase rectifier, and an inverter circuit configured to convert the voltage of the smoothing capacitor into an AC voltage to drive a motor. In this three-phase full-wave rectification type converter, as a system for improving a power factor and a power supply current harmonic, there has been proposed a system including a step-up converter configured to step up the output voltage of the three-phase rectifier by chopping, and a switching control unit configured to control a switching element of the step-up converter. In the system, the switching control unit controls an on duty of the switching element so that a power supply current has a square wave (for example, see Patent Literature 1). In Patent Literature 1, the power supply current has a square wave, and hence as compared to a case in which a DC reactor is used immediately after the three-phase rectifier, particularly a fifth-order harmonic component of the power supply current harmonic is reduced, and thus this technology has an advantage in terms of harmonic regulation.

PATENT LITERATURE

Patent Literature 1: Japanese Unexamined Patent Application Publication No. 2010-187521

In Patent Literature 1, the voltage obtained immediately after the rectifier is the input of the step-up converter. It is known that a voltage Vin output from a rectifier is pulsed at a frequency that is six times as large as a power supply voltage (360 Hz in the case of a commercial frequency of 60 Hz). A constant reactor voltage cannot be obtained when the input voltage is pulsed. Therefore, it is difficult to control a reactor current value of the step-up converter to be constant.

In order to control the current value to be constant even when the output voltage from the rectifier is pulsed, it is conceivable to design response of a current control system to be sufficiently high and set a high carrier frequency. However, when the carrier frequency is increased, loss of the power converter is increased, and thus noise is also increased.

SUMMARY

The present invention has been made in order to overcome the problems described above, and an object of the present invention is to provide a power converter capable of having less loss and reducing noise while suppressing fluctuations in reactor voltage even when a carrier frequency is decreased, and to provide an air-conditioning apparatus using the power converter.

A power converter according to one embodiment of the present invention includes: a rectifier, which is configured to rectify three-phase AC power; a transformation circuit, which includes a reactor, a switching element, and a backflow prevention element, and is configured to transform a voltage rectified in the rectifier; a capacitor, which is configured to smooth an output voltage of the transformation circuit; a power supply voltage detector, which is configured to detect a line voltage or phase voltage of at least one phase of the three-phase AC power; a current detector, which is configured to detect a reactor current flowing through the reactor; an output voltage detector, which is configured to detect the output voltage output from the transformation circuit; and a converter control unit, which is configured to control the switching element of the transformation circuit based on the line voltage or phase voltage detected by the power supply voltage detector, and on the reactor current detected by the current detector, the converter control unit including: a current control unit, which is configured to calculate a current command value based on the output voltage detected by the output voltage detector; a current subtractor, which is configured to calculate a current deviation between the current command value calculated in the current control unit and the reactor current; a switching command value control unit, which is configured to calculate a switching command value from the current deviation calculated in the current subtractor; a current deviation accumulation unit, which is configured to generate a control amount obtained by integrating the current deviation calculated in the current subtractor for each of different power supply phase angles, and includes a plurality of integrators provided for the respective different power supply phase angles of a power supply voltage; a phase angle calculation unit, which is configured to calculate a power supply phase angle based on the line voltage or phase voltage detected by the power supply voltage detector; an input selection unit, which is configured to cause one of the plurality of integrators, which corresponds to the power supply phase angle calculated in the phase angle calculation unit, to accumulate the current deviation; an output selection unit, which is configured to cause one of the plurality of integrators, which corresponds to a phase angle that is advanced by a set delay phase from the power supply phase angle calculated in the phase angle calculation unit, to output the control amount; and a switching control unit, which is configured to generate a switching signal to be output to the switching element with use of the control amount output from the output selection unit and the switching command value.

According to the power converter of the one embodiment of the present invention, an error accumulation unit accumulates the current deviation, the output selection unit outputs the control amount at a phase angle that is advanced by the set delay phase, and the switching signal is generated based on the switching command value and the control amount. In this manner, an error included in the switching command value is canceled, and thus the loss and the noise can be reduced while fluctuations in reactor voltage are suppressed even when the carrier frequency is decreased.

DETAILED DESCRIPTION

Embodiment 1

Figure 1:
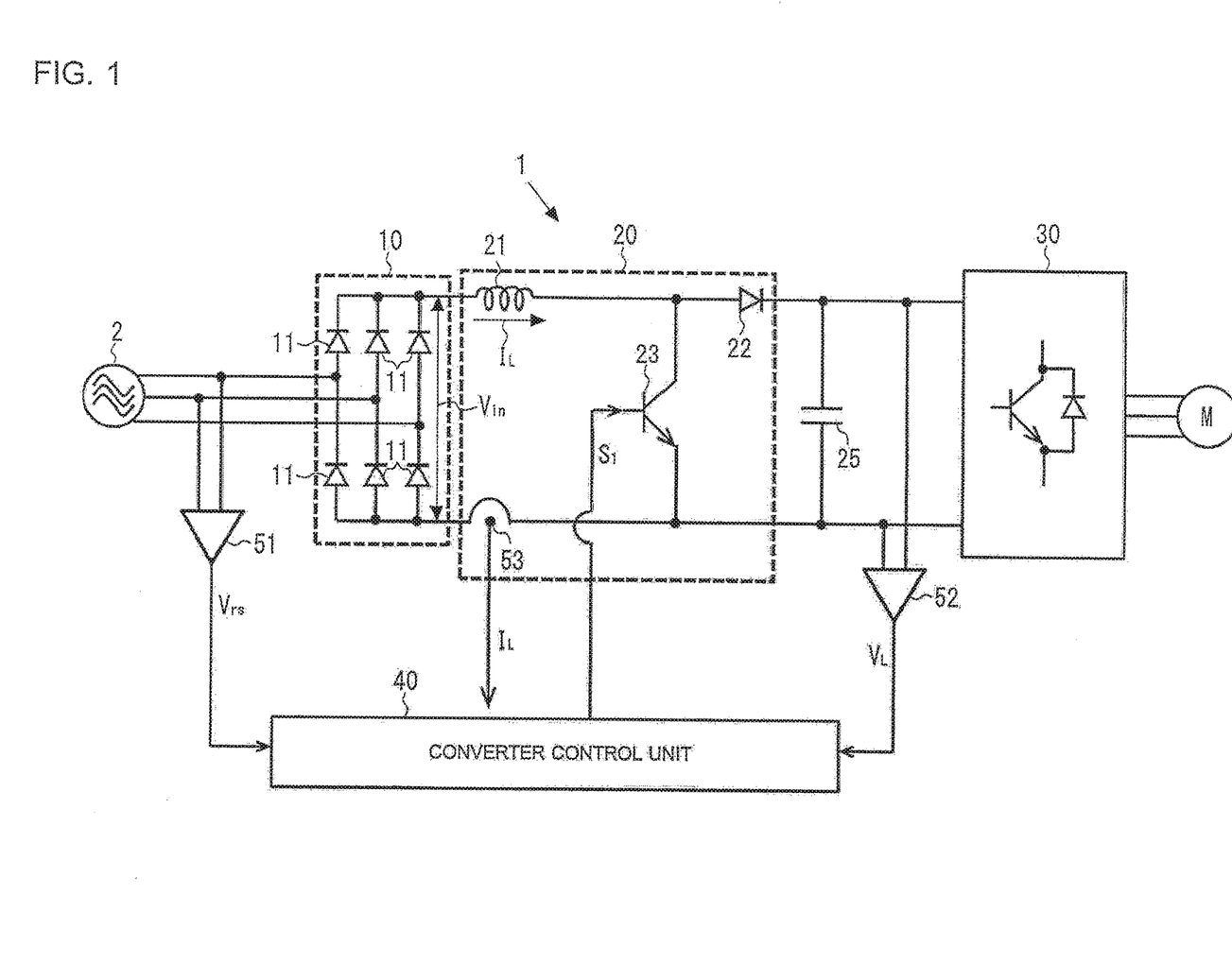
FIG. 1 is a circuit diagram for illustrating a power converter according to Embodiment 1 of the present invention.

Now, embodiments of the present invention are described with reference to the drawings. FIG. 1 is a circuit diagram for illustrating a power converter according to Embodiment 1 of the present invention. With reference to FIG. 1, a power converter 1 is described. The power converter 1 of FIG. 1 is connected to a load M, for example, a motor for a compressor or an air sending device of an air-conditioning apparatus, and supplies an alternating current at a predetermined frequency to the load M. The power converter 1 includes a rectifier 10, a transformation circuit 20, a smoothing capacitor 25, and an inverter 30.

The rectifier 10 is an AC-DC converter configured to rectify an AC voltage (for example, AC 200 V) of a three-phase AC power supply 2, and is made up of, for example, a three-phase full-wave rectifier including six bridge-connected diodes 11. The rectifier 10 outputs a rectified voltage Vin to the transformation circuit 20.

The transformation circuit 20 is a DC-DC converter configured to transform the voltage Vin rectified in the rectifier 10 to any voltage (for example, DC 365 V), and is made up of, for example, a step-up chopper circuit. The transformation circuit 20 includes a step-up reactor 21, a backflow prevention element 22, and a switching element 23. The reactor 21 is connected to an output terminal of the rectifier 10, and the backflow prevention element 22 is connected to the reactor 21 in series. The switching element 23 is connected between the reactor 21 and the backflow prevention element 22.

The backflow prevention element 22 is made up of a backflow prevention diode, for example, a fast recovery diode. The switching element 23 is turned on or off in response to a switching signal S1, and is made up of, for example, a MOSFET, an IGBT, or other semiconductor elements, or a silicon carbide (SiC) element, a gallium nitride (GaN) element, a diamond element, or other wide bandgap semiconductors having a larger bandgap than that of a silicon (Si) element. The switching signal S1 is transmitted from a converter control unit 40, and is output from the converter control unit 40 so that an output voltage Vdc of the transformation circuit 20 becomes a target voltage (voltage command value Vdc*).

When the switching element 23 is turned on, the reactor 21 is applied with the voltage Vin rectified by the rectifier 10, and conduction of current is inhibited by the backflow prevention element 22. Meanwhile, when the switching element 23 is turned off, current is conducted through the backflow prevention element 22, and a voltage in a direction opposite to that when the switching element 23 is turned on is induced to the reactor 21. At this time, the energy accumulated in the reactor 21 while the switching element 23 is turned on is transferred to the smoothing capacitor 25 side when the switching element 23 is turned off. An on duty of the switching element 23 is controlled by the converter control unit 40 to control the output voltage Vdc from the transformation circuit 20. Then, the smoothing capacitor 25 smoothes the output voltage Vdc output from the transformation circuit 20.

The inverter 30 converts the DC power smoothed and charged by the smoothing capacitor 25 into AC power, and includes a plurality of switching elements. The inverter 30 is connected to the load M, for example, the motor for the compressor in the air-conditioning apparatus, and supplies the alternating current at a predetermined frequency to the load M. The operation of the inverter 30 is controlled by an inverter control unit (not shown).

Next, an operation example of the power converter 1 of FIG. 1 is described. The AC voltage supplied from the three-phase AC power supply 2 is rectified with use of the rectifier 10 to be output. The voltage Vin rectified by the rectifier 10 is stepped up in the transformation circuit 20, and is accumulated in the smoothing capacitor 25. At this time, the operation of the transformation circuit 20 is controlled so that a constant reactor current IL is obtained. Then, the output voltage Vdc stepped up in the transformation circuit 20 is converted into a three-phase AC by the inverter 30, and is supplied to the motor M.

As described above, the operation of the switching element 23 in the transformation circuit 20 is controlled by the converter control unit 40, and the converter control unit 40 performs switching control based on information detected by each detector. That is, the power converter 1 includes a power supply voltage detector 51 configured to detect a line voltage or phase voltage of at least one phase of the three-phase AC power supply 2, an output voltage detector 52 configured to detect the output voltage Vdc that is output from the transformation circuit 20 and accumulated in the smoothing capacitor 25, and a current detector 53 configured to detect the reactor current IL flowing through the reactor 21. Then, the converter control unit 40 is configured to control the switching operation of the switching element 23 based on the line voltage or the phase voltage, the output voltage Vdc, and the reactor current IL flowing through the reactor 21, to thereby control the output voltage Vdc output from the transformation circuit 20.

Figure 2:
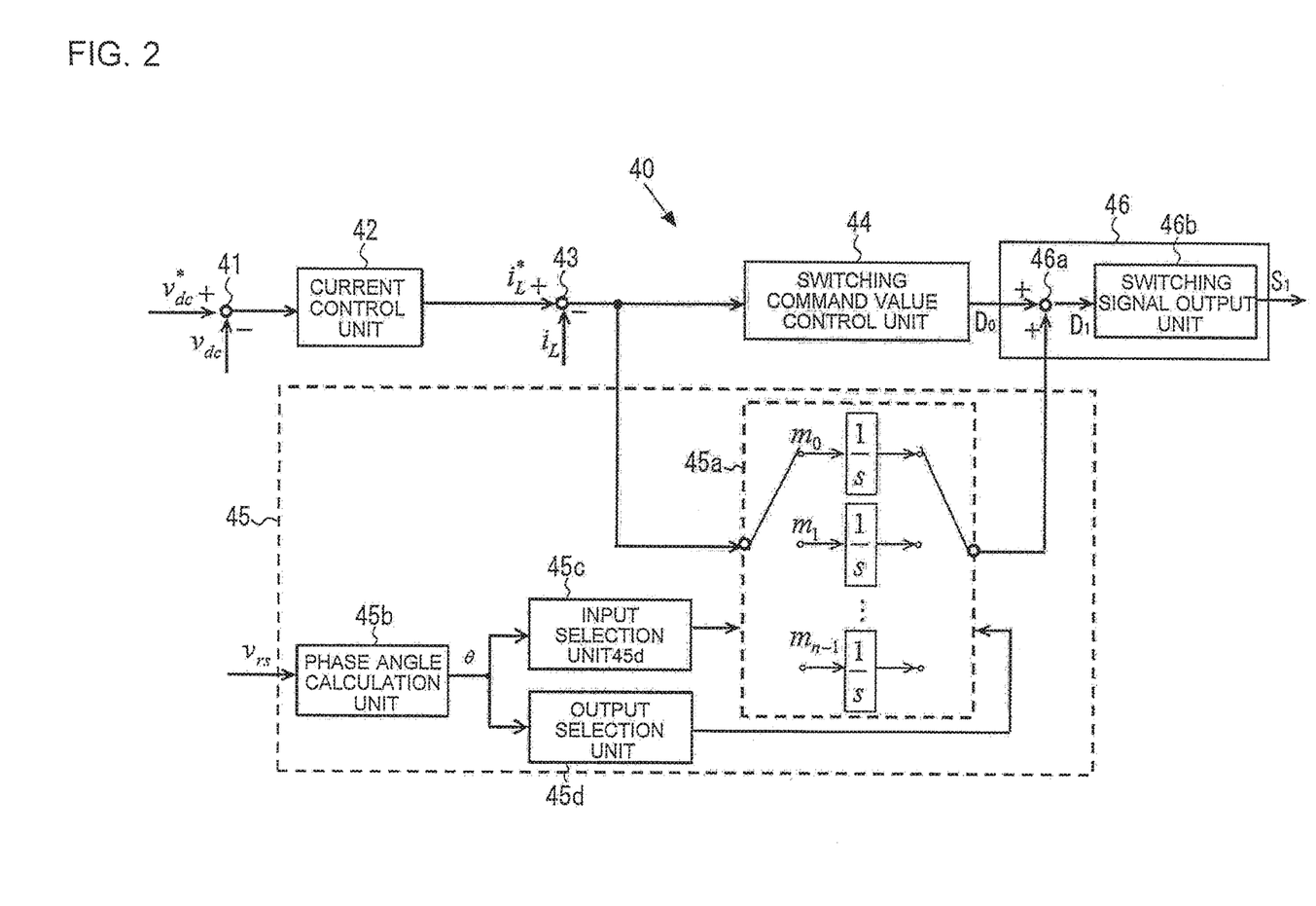
FIG. 2 is a block diagram for illustrating an example of a converter control unit of the power converter of FIG. 1.

FIG. 2 is a block diagram for illustrating an example of the converter control unit in the power converter of FIG. 1. With reference to FIG. 1 and FIG. 2, the converter control unit 40 is described. The configuration of the converter control unit 40 of FIG. 1 and FIG. 2 is constructed by executing a program stored in a microcomputer. The converter control unit 40 includes a feedback loop control system that is based on the output voltage Vdc, and a minor loop control system that is based on the reactor current IL. Specifically, the converter control unit 40 includes, as a voltage control system, a voltage subtractor 41 and a current control unit 42, and includes, as a current control system, a current subtractor 43 and a switching command value control unit 44.

The voltage subtractor 41 calculates a voltage difference between the voltage command value Vdc* (target voltage value) and the output voltage Vdc. The current control unit 42 calculates a current command value IL* of the reactor current IL flowing through the reactor 21, based on the voltage difference calculated in the voltage subtractor 41. In this case, the current control unit 42 calculates the current command value IL* by performing, for example, PID control in which proportional control, integral control, and derivative control are combined. The control method performed by the current control unit 42 is not limited as long as the current command value IL* can be calculated. For example, the current control unit 42 may perform PI control including only proportional control and integral control, or may perform P control including only proportional control. It is enough that the control be a combination of any of the proportional control, the integral control, and the derivative control.

The current subtractor 43 calculates a current deviation between the current command value IL* calculated in the current control unit 42 and the reactor current IL detected by the current detector 53. The switching command value control unit 44 calculates a switching command value (for example, duty ratio) D0 based on the current deviation calculated in the current subtractor 43. In this case, the switching command value control unit 44 calculates the switching command value D0 by performing, for example, PID control in which proportional control, integral control, and derivative control are combined. The control method performed by the switching command value control unit 44 is not limited as long as the switching command value D0 can be calculated. For example, the switching command value control unit 44 may perform PI control including only proportional control and integral control, or may perform P control including only proportional control. It is enough that the control be a combination of any of the proportional control, the integral control, and the derivative control.

Further, the converter control unit 40 includes a switching control unit 46 configured to generate the switching signal S1 to be output to the switching element 23. The switching control unit 46 generates the switching signal S1 based on the switching command value D0 calculated in the switching command value control unit 44.

In this case, the converter control unit 40 includes an error accumulation unit 45 configured to accumulate a harmonic component of the reactor current IL. The switching control unit 46 has a function of generating the switching signal S1 with use of not only the switching command value D0 but also a control amount output from the error accumulation unit 45.

The error accumulation unit 45 includes a current deviation accumulation unit 45a, a phase angle calculation unit 45b, an input selection unit 45c, and an output selection unit 45d. The current deviation accumulation unit 45a accumulates the current deviation for each power supply phase angle to generate the control amount, and includes N integrators $m_0$ to $m_{n-1}$ provided for the respective different power supply phase angles of a power supply voltage Vrs. That is, one period of the AC voltage is divided into N ranges of power supply phase angles, and the integrators $m_0$ to $m_{n-1}$ are provided for the respective divided ranges of the power supply phase angles.

The number N of the plurality of integrators $m_0$ to $m_{n-1}$ is preferred to be set based on the period of the power supply voltage (power supply frequency) and a control period (control frequency). For example, when the control frequency is 18,000 Hz and the power supply frequency of the three-phase AC power supply 2 is 60 Hz, the number N is set to 18,000/60=300. Then, one period of the AC voltage is divided into N (=300) ranges of power supply phase angles, and N (=300) integrators $m_0$ to $m_{n-1}$ are mounted. Therefore, one integrator corresponds to a power supply phase angle of 1.2 degrees (360 degrees/300), and integrates the current deviation for the power supply phase angle of 1.2 degrees.

The phase angle calculation unit 45b calculates a power supply phase angle θ of the power supply voltage Vrs based on the line voltage or the phase voltage. As described above, the power supply voltage detector 51 detects a line voltage or phase voltage of at least one phase of the three-phase AC power supply 2, and hence the phase angle calculation unit 45b calculates the power supply phase angle θ of one of the three phases. Further, the phase angle calculation unit 45b has a function of detecting the zero crossing of the power supply voltage Vrs to detect the period of the power supply voltage Vrs. The harmonic component of the reactor current IL has the same frequency characteristic as the period of the power supply voltage. The phase angle calculation unit 45b detects the zero crossing of the power supply voltage with use of this property. Thus, the periodicity of the reactor current IL can be known with a simple method, and the circuit can be formed at low cost.

The input selection unit 45c causes one of the integrators $m_0$ to $m_{n-1}$, which corresponds to the phase angle calculated in the phase angle calculation unit 45b, to accumulate the current deviation. The output selection unit 45d causes one of the integrators $m_0$ to $m_{n-1}$, which corresponds to a power supply phase angle that is advanced by a set delay phase from the power supply phase angle θ calculated in the phase angle calculation unit 45b, to output the control amount. As described above, the harmonic component of the reactor current IL has the same frequency characteristic as the period of the power supply voltage Vrs, and hence it is preferred that the set delay phase be set to one power supply period. In this manner, an error can be canceled with use of the control amount having the same frequency characteristic, and hence the fluctuations in reactor current IL can be reliably suppressed.

Further, the input selection unit 45c and the output selection unit 45d have a function of controlling the timing to cause each of the integrators $m_0$ to $m_{n-1}$ to integrate the current deviation and perform output in consideration of two types of delay, that is, delay due to waste time and delay due to current control. The delay due to waste time is caused by calculation time delay of a controller, for example, a microcomputer, and generally corresponds to one control period.

In the delay due to current control, the relationship between the reactor current iL and a reactor voltage $v_L$ is represented by a voltage equation of Expression (1).

$$i_L = \frac{1}{L} \int v_L dt \qquad (1)$$

As shown in Expression (1), the reactor current IL is represented by the integral of the reactor voltage $V_L$. Therefore, even when the transformation circuit 20 performs output so that the reactor voltage $V_L$ is obtained, a certain time is required until the output is reflected as a current value, and delay of one control period is required to be added. As a result, the two types of delay correspond to delay of two control periods. Therefore, the timing for the output selection unit 45d to select the output is set at a timing that is advanced by two control periods from the timing for the input selection unit 45c to select the input.

The switching control unit 46 generates the switching signal S1 to be output to the switching element 23 with use of the control amount output from the error accumulation unit 45 and the switching command value D0 calculated in the switching command value control unit 44. Specifically, the switching control unit 46 includes an adder 46a and a switching signal output unit 46b. The adder 46a adds the control amount output from the error accumulation unit 45 to the switching command value D0, and outputs an added switching command value D1. At this time, the adder 46a may add a value obtained by multiplying the control amount by a predetermined constant to the switching command value D0.

The switching signal output unit 46b generates the switching signal S1 indicating the ON/OFF of the switching element 23 from the added switching command value D1 (duty ratio) that is the output of the adder 46a. At this time, the switching signal output unit 46b can use various known methods, for example, generation of the switching signal 51 with use of a triangle wave having a carrier frequency.

Next, with reference to FIG. 2, an operation example of the converter control unit 40 is described. First, the voltage subtractor 41 calculates the voltage difference between the voltage command value Vdc* (target voltage value) and the present output voltage Vdc, and the current control unit 42 calculates the current command value IL* based on the voltage difference. After that, the current subtractor 43 calculates the current deviation between the current command value IL* and the reactor current IL, and the switching command value control unit 44 calculates the switching command value D0 based on the current deviation.

Meanwhile, the phase angle calculation unit 45b of the error accumulation unit 45 calculates the present power supply phase angle θ based on the power supply voltage Vrs. After that, the input selection unit 45c selects the integrator at which the current deviation is integrated based on the power supply phase angle θ, and the selected integrator integrates the current deviation. Further, the output selection unit 45d selects, for example, the integrator corresponding to the phase that is advanced by one period from the present power supply phase angle θ, and the control amount accumulated in the selected integrator is output.

After that, the adder 46a of the switching control unit 46 adds the control amount to the switching command value D0 so as to output the added switching command value D1 in which the control amount of the current deviation is reflected. After that, the switching signal output unit 46b generates the switching signal S1, and outputs the switching signal S1 to the switching element 23 of the transformation circuit 20.

According to Embodiment 1, the error accumulation unit 45 accumulates the current deviation, and the output selection unit 45d outputs the control amount at a phase angle that is advanced by the set delay phase. Thus, the switching signal S1 is generated based on the switching command value D0 and the control amount. In this manner, the fact that the period of the power supply voltage is related to the period of the pulsing of the reactor current IL is used so that the current deviation from the predetermined current value of the reactor current IL is brought close to zero current. Thus, the performance of current control can be improved. As a result, the control response in the switching command value control unit 44 can be decreased, and the carrier frequency can be decreased. Thus, the switching loss and the noise of the power converter 1 can be suppressed.

Figure 3:
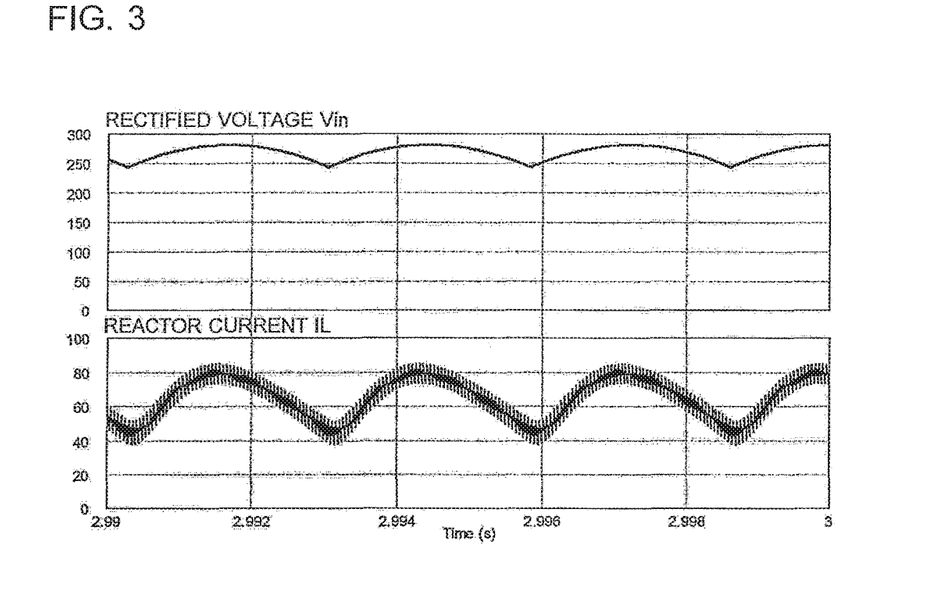
FIG. 3 is a graph for showing an example of a rectified voltage and a reactor current in a related-art power converter that is slow in response of current control and does not use an error accumulation unit.

That is, in a case of a configuration in which the transformation circuit 20 made up of a step-up converter is used immediately after the rectifier 10, the reactor current cannot be controlled to be constant unless the response of the current control is increased in speed. FIG. 3 is a graph for showing an example of a rectified voltage and a reactor current in a related-art power converter that is slow in response of current control and does not use the error accumulation unit. As shown in FIG. 3, the voltage Vin obtained immediately after the rectifier 10 varies depending on the power supply phase angle because a difference between the maximum value and the minimum value of the power supply voltage Vrs of each phase is output, and the voltage Vin is pulsed at 360 Hz (when the power supply frequency is 60 Hz), which is a frequency that is six times as large as the power supply. When the input voltage is pulsed as described above, the voltage applied to both terminals of the reactor 21 changes, and hence the reactor current IL is also pulsed at 360 Hz.

Figure 4:
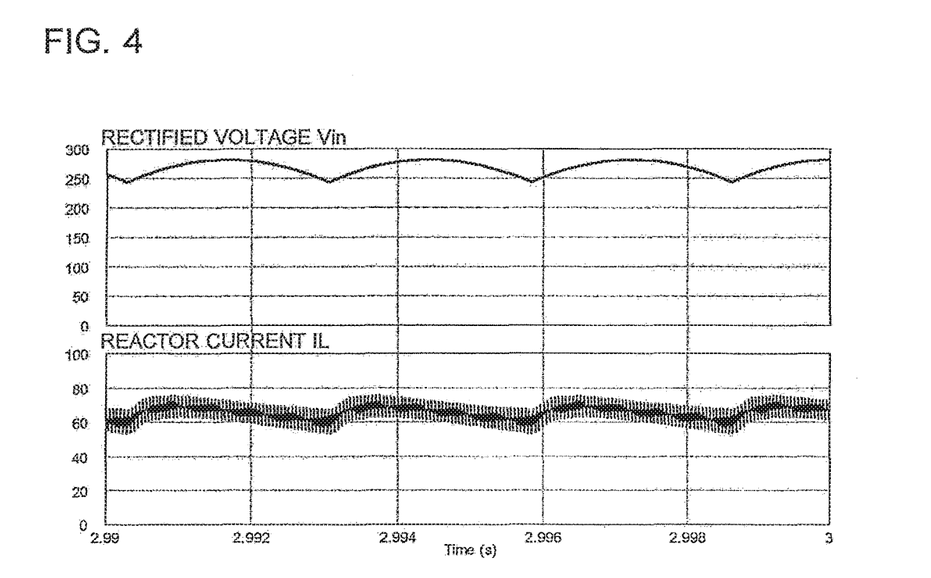
FIG. 4 is a graph for showing an example of a rectified voltage and a reactor current in a related-art power converter that is fast in response of current control and does not use an integration control unit.

In order to prevent this pulsing from occurring, it is conceivable to cause the current control system for the reactor 21 to respond at a higher speed so as to obtain a frequency that is sufficiently higher than 360 Hz. FIG. 4 is a graph for showing an example of a rectified voltage and a reactor current in a related-art power converter that is fast in response of current control and does not use an integration control unit. As shown in FIG. 4, when the current control response is increased in speed, the pulsing of the reactor current is reduced. However, since the reactor control response is needed to be increased in speed, and hence it is required to set a carrier period to have a higher speed. This leads to increase in switching loss of a converter.

Figure 5:
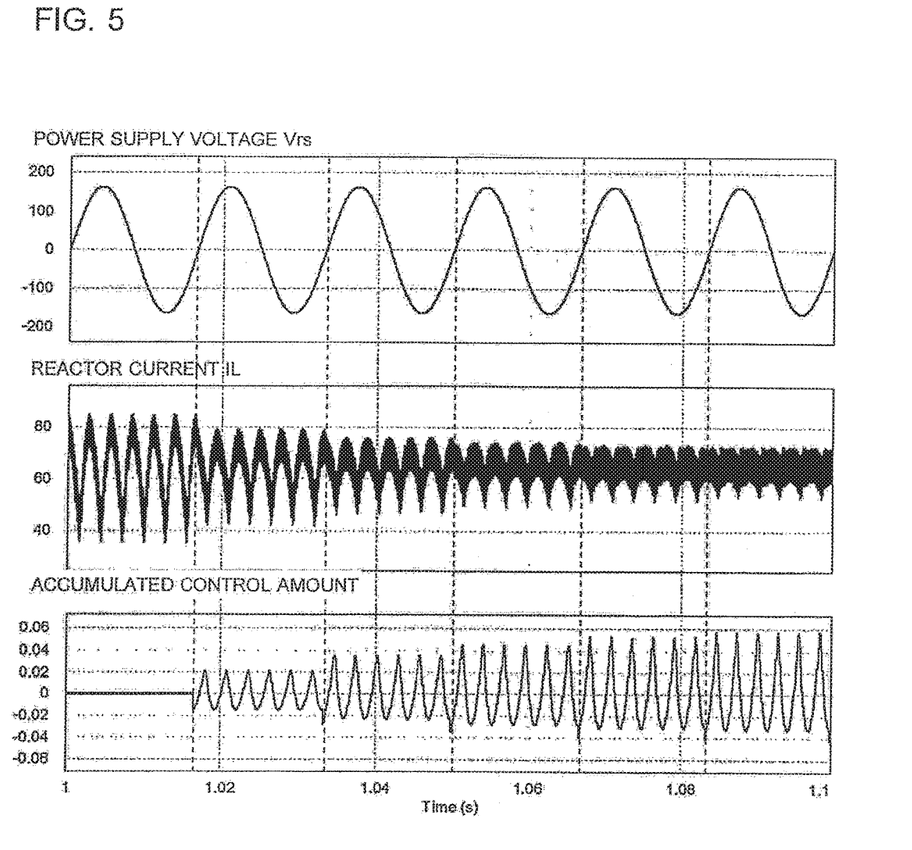
FIG. 5 is a graph for showing an example of a power supply voltage, a reactor current, and a control amount in the power converter of FIG. 1 and FIG. 2.

In view of this, the reactor current control using the error accumulation unit 45 as illustrated in FIG. 2 is performed so that the pulsing of the reactor current can be reduced even when the response of the reactor control is decreased in speed. FIG. 5 is a graph for showing an example of the power supply voltage Vrs, the reactor current IL, and the control amount in the power converter of FIG. 1 and FIG. 2. In FIG. 5, the power supply voltage Vrs, the reactor current IL, and the control amount are shown in order from the top.

As shown in FIG. 5, it can be confirmed that the pulsing of the reactor current is reduced for each period of the power supply voltage Vrs. That is, the current deviation is stored in the integrator corresponding to the power supply phase angle θ, and the pulsing of one period of the power supply voltage Vrs is accumulated in each of the integrators $m_0$ to $m_{n-1}$ for each phase angle. Then, in synchronization with the timing of the power supply phase angle θ after one period of the power supply voltage Vrs, the control amount accumulated in corresponding one of the integrators $m_0$ to $m_{n-1}$ is output, and an error is canceled at the next power supply period. This operation is achieved in the separate integrators $m_0$ to $m_{n-1}$ for all of the power supply phase angles θ so that the current deviations of all of the power supply phase angles θ can be brought close to zero. In this manner, as shown in FIG. 5, the current deviation can be brought closer to zero as compared to that in the previous power supply period. This control is repeated for each period of the power supply voltage Vrs, and the current deviation finally becomes zero.

Further, when the carrier frequency is increased as shown in FIG. 4, the control period is shortened, and the calculation is required to be ended in a limited time period. Therefore, a high-performance microcomputer is required, which leads to increase in cost. Meanwhile, as shown in FIG. 5, in the power converter 1, the pulsing of the reactor current IL can be suppressed even without increasing the carrier frequency, and hence the control period can be lengthened. As a result, an inexpensive microcomputer that is low in calculation speed can be used, and thus the cost can be reduced.

Further, the switching signal S1 is generated with use of the control amount output from the error accumulation unit 45 and the switching command value D0 calculated in the switching command value control unit 44. Therefore, a control gain can be set such that resistance against disturbance is improved by the switching command value control unit 44 and the followability to the target value (harmonic suppression) is improved by the error accumulation unit 45. In this manner, the control can be achieved with higher accuracy as compared to the related-art control using only the PID control. That is, in repetitive control that uses an error of the past one period, the periodicity of the current is important. When a power supply environment varies as in momentary power interruption, the periodicity of the current is lost. Also in this case, the control gain may be set as described above so that the PID control is mainly operated when the power supply environment varies, and thus the resistance against the variation in power supply environment can be improved.

Further, when the output selection unit 45d causes the integrator, which corresponds to the phase angle that is advanced by one period of the power supply voltage as the set delay phase, to output the control amount, an error can be canceled with use of the control amount having the same frequency characteristic, and hence the fluctuations in reactor current IL can be reliably suppressed.

Further, when the output selection unit 45d selects the integrator that is caused to output the control amount at a timing that is advanced by two control periods from the selection of the one of the integrators $m_0$ to $m_{n-1}$ by the input selection unit 45c, the integration of the current deviation and the output of the control amount are performed at a timing in consideration of the above-mentioned two types of delay. Therefore, when the error is canceled with use of the control amount having the same frequency characteristic, the phase shift can be suppressed, and the fluctuations in reactor current IL can be reliably suppressed.

Embodiment 2

Figure 6:
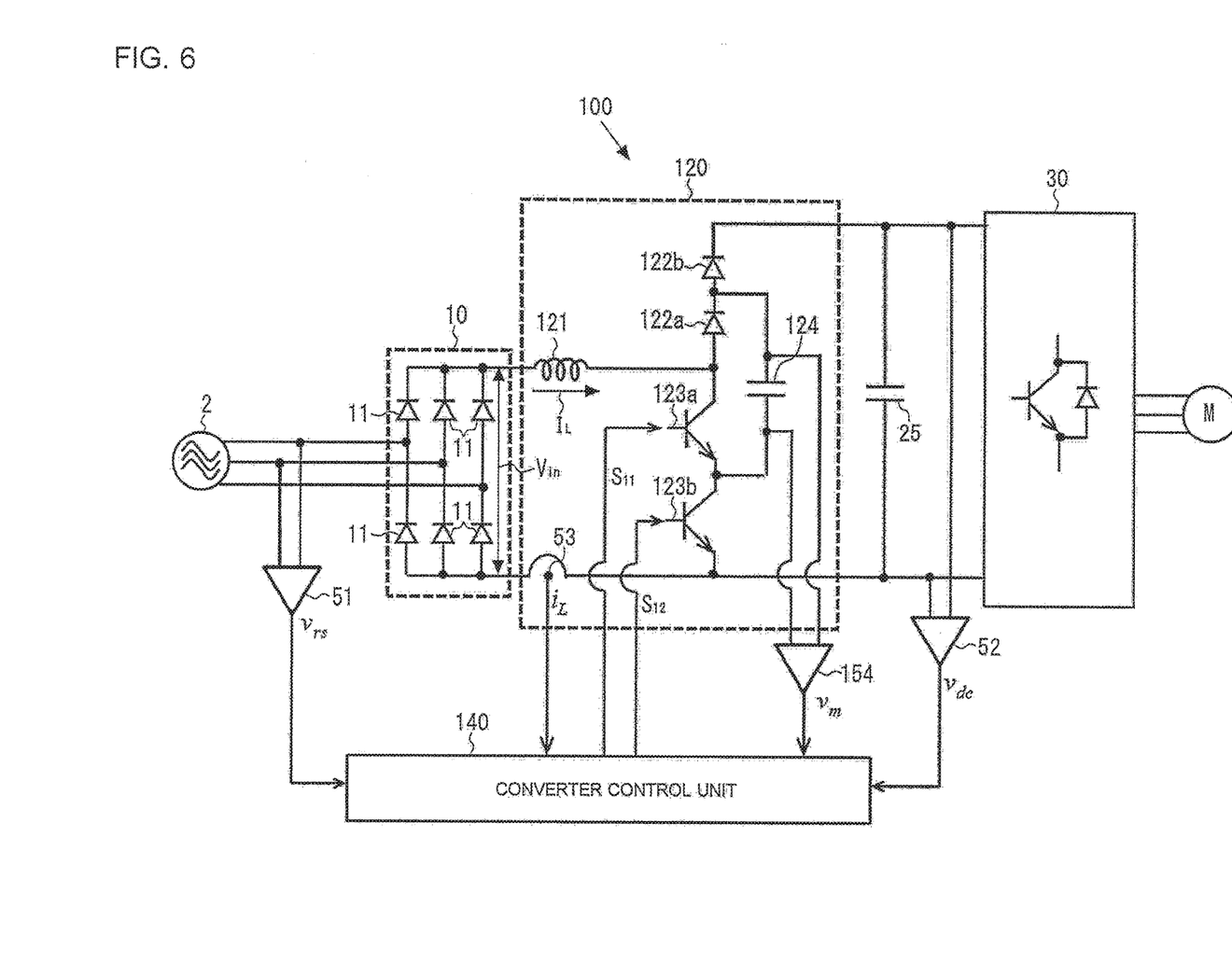
FIG. 6 is a block diagram for illustrating a power converter according to Embodiment 2 of the present invention.

FIG. 6 is a block diagram for illustrating a power converter according to Embodiment 2 of the present invention. With reference to FIG. 6, a power converter 100 is described. In the power converter 100 of FIG. 6, parts having the same configuration as those of the power converter 1 of FIG. 1 are denoted by the same reference symbols, and description thereof is omitted herein. In the power converter 100 of FIG. 6, a transformation circuit 120 is made up of a multilevel converter.

Specifically, the transformation circuit 120 includes a reactor 121, two backflow prevention elements 122a and 122b, two switching elements 123a and 123b, and an intermediate capacitor 124. The reactor 121 is connected to the output terminal of the rectifier 10, and the backflow prevention elements 122a and 122b are connected to each other in series, and are also connected to the reactor 121 in series. The switching elements 123a and 123b are connected between the reactor 121 and the backflow prevention element 122a. Further, the intermediate capacitor 124 is connected between the backflow prevention elements 122a and 122b and between the switching elements 123a and 123b.

The switching operation of the switching elements 123a and 123b in the transformation circuit 120 is controlled by a converter control unit 140. Further, the power converter 100 includes an intermediate voltage detector 154 configured to detect an intermediate voltage Vm of the intermediate capacitor 124. Then, the converter control unit 140 outputs a switching signal S11 to the switching element 123a and outputs a switching signal S12 to the switching element 123b based on the power supply voltage Vrs, the output voltage Vdc, the reactor current IL, and the intermediate voltage Vm detected by the intermediate voltage detector 154.

The basic function of the transformation circuit 120 being the multilevel converter is the same as that of the transformation circuit 20 being the step-up converter of FIG. 1, but an output voltage level of a chopper in the multilevel converter is 3 levels. The intermediate voltage Vm of the intermediate capacitor 124 is controlled so as to be ½ Vdc, which is a half of the output voltage Vdc of the smoothing capacitor 25, and this intermediate voltage command value Vm* is input to the converter control unit 140. Then, the multilevel converter can output 3 levels of 0, 1/2 Vdc, and Vdc. Therefore, the switching loss can be reduced, and a high efficiency can be achieved because a carrier ripple current of the reactor 121 is reduced.

Figure 7:
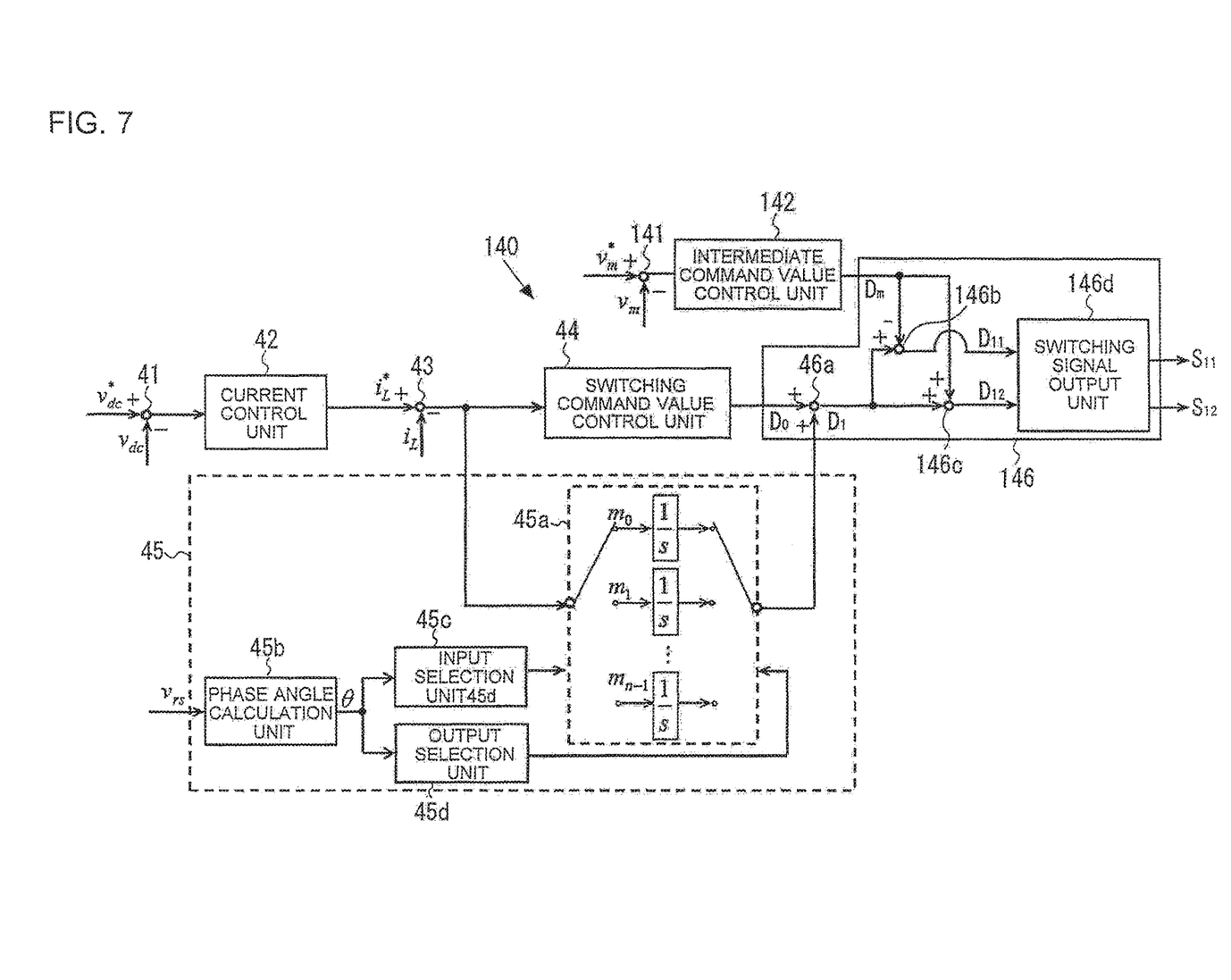
FIG. 7 is a block diagram for illustrating an example of a converter control unit of the power converter of FIG. 6.

FIG. 7 is a block diagram for illustrating an example of the converter control unit 140 in the power converter of FIG. 6. In the converter control unit 140 of FIG. 7, parts having the same configuration as those of the converter control unit 40 of FIG. 2 are denoted by the same reference symbols, and description thereof is omitted herein. In FIG. 7, the converter control unit 140 generates the switching signals S11 and S12 in consideration of the intermediate voltage Vm of the intermediate capacitor 124.

Specifically, the converter control unit 140 includes an intermediate voltage subtractor 141 configured to calculate an intermediate voltage deviation between the intermediate voltage command value Vm* and the intermediate voltage Vm, and an intermediate command value control unit 142 configured to calculate an intermediate switching command value Dm based on the intermediate voltage deviation calculated in the intermediate voltage subtractor 141. The intermediate command value control unit 142 calculates the intermediate switching command value Dm by performing PID control in which proportional control, integral control, and derivative control are combined. The intermediate command value control unit 142 may perform, for example, PI control including only proportional control and integral control, or may perform P control including only proportional control. It is only required that the control be a combination of any of the proportional control, the integral control, and the derivative control.

A switching control unit 146 includes the adder 46a, an intermediate subtractor 146b, an intermediate adder 146c, and a switching signal output unit 146d. The intermediate subtractor 146b subtracts an intermediate switching command value Dm from the added switching command value D1 output from the adder 46a to output an added switching command value D11. The intermediate adder 146c adds an intermediate switching command value Dm to the added switching command value D1 output from the adder 46a to output an added switching command value D12.

The switching signal output unit 146d generates the switching signal S11 for the switching element 123a side based on the added switching command value D11, and generates the switching signal S12 for the switching element 123b side based on the added switching command value D12.

As in Embodiment 2, even when the transformation circuit 120 is made up of the multilevel converter, similarly to Embodiment 1, the current deviation is brought close to zero current by providing the error accumulation unit 45, and hence the performance of current control can be improved. Therefore, the control response in the switching command value control unit 44 can be decreased, and further the carrier frequency can be decreased. In this manner, the loss of the power converter can be reduced, and the noise can be suppressed. Further, the control period can be lengthened by decreasing the carrier frequency. Therefore, an inexpensive microcomputer that is low in calculation speed can be used, and thus the cost can be reduced.

Embodiment 3

Figure 8:
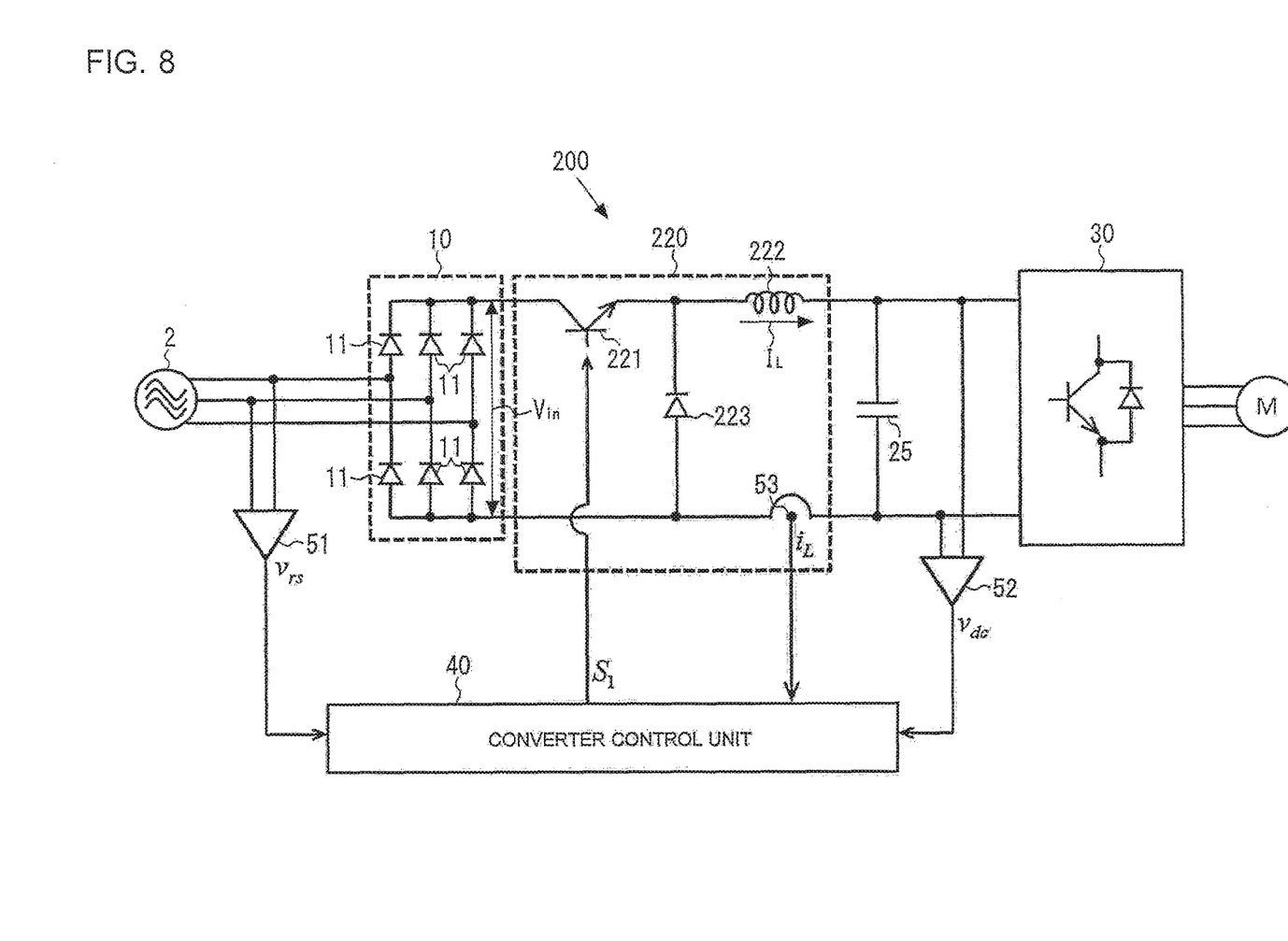
FIG. 8 is a block diagram for illustrating a power converter according to Embodiment 3 of the present invention.

FIG. 8 is a block diagram for illustrating a power converter according to Embodiment 3 of the present invention. With reference to FIG. 8, a power converter 200 is described. In the power converter 200 of FIG. 8, parts having the same configuration as those of the power converter 1 of FIG. 1 are denoted by the same reference symbols, and description thereof is omitted herein. In the power converter 200 of FIG. 8, a transformation circuit 220 is made up of a step-down converter.

Specifically, the transformation circuit 220 of FIG. 8 includes a switching element 221 connected to the output terminal of the rectifier 10, a reactor 222 connected to the switching element 221 in series, and a backflow prevention element 223 connected between the switching element 221 and the reactor 222. Further, the converter control unit 40 outputs the switching signal 51 to the switching element 221 to control the step-down.

Even when the transformation circuit 220 is a step-down converter as in Embodiment 3, similarly to Embodiment 1, the pulsing of the reactor current IL can be suppressed, and thus the performance of the current control can be improved. Therefore, the control response in the switching command value control unit 44 can be decreased, and the carrier frequency can be decreased. In this manner, the loss of the power converter can be reduced, and the noise can be suppressed. Further, the control period can be lengthened by decreasing the carrier frequency. Therefore, an inexpensive microcomputer that is low in calculation speed can be used, and thus the cost can be reduced.

Embodiment 4

Figure 9:
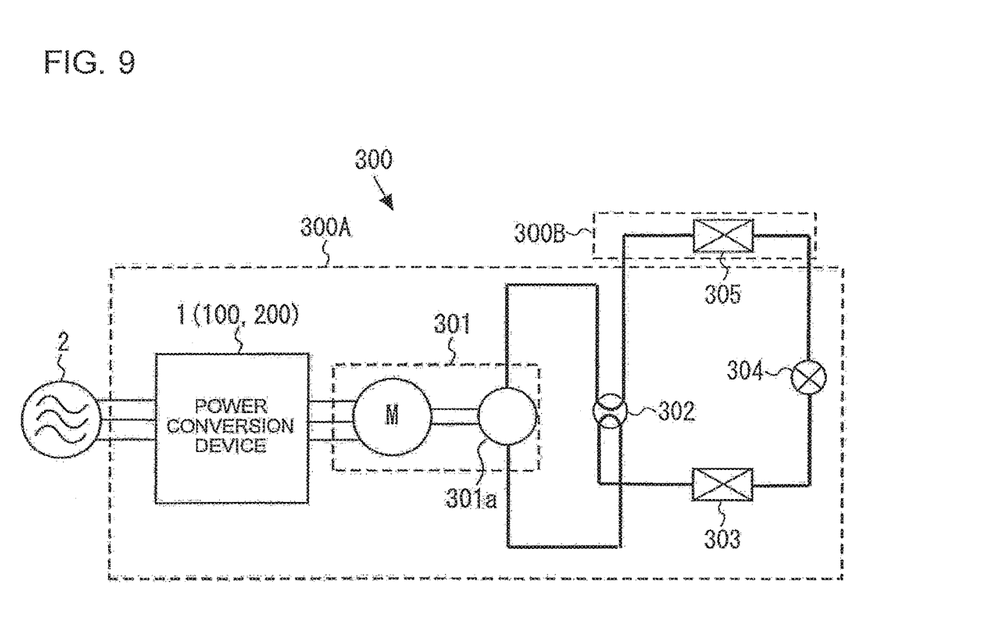
FIG. 9 is a circuit diagram of an air-conditioning apparatus using the power converter according to the present invention.

FIG. 9 is a circuit diagram of an air-conditioning apparatus using the power converter according to the present invention. With reference to FIG. 9, an air-conditioning apparatus 300 is described. FIG. 9 is an example of a case in which one of the power converters 1, 100, and 200 according to Embodiments 1 to 3 is applied. The air-conditioning apparatus 300 of FIG. 9 performs a cooling operation and a heating operation by a heat pump system. The air-conditioning apparatus 300 includes a refrigerant circuit in which a compressor 301, a flow switching device 302, an outdoor heat exchanger 303, an expansion device 304, an indoor heat exchanger 305, the flow switching device 302, and the compressor 301 are connected in the stated order by refrigerant pipes. Among the components, an outdoor unit 300A includes the power converter 100, the compressor 301, the flow switching device 302, the outdoor heat exchanger 303, and the expansion device 304, and an indoor unit 300B includes the indoor heat exchanger 305.

Among the components, the compressor 301 includes a compression element 301a configured to compress refrigerant, and the motor M coupled to the compression element 301a. Further, the power converter 1 (100, 200) is the power converter according to any one of Embodiments 1 to 3, which receives power supplied from the three-phase AC power supply 2, and supplies the power to the motor M to rotationally drive the motor M.

Next, the operation of the air-conditioning apparatus illustrated in FIG. 9 is described. The cooling operation is described as an example. In this case, the flow switching device 302 switches the flow so that refrigerant discharged from the compressor 301 flows toward the outdoor heat exchanger 303, and the refrigerant flowing out from the indoor heat exchanger 305 flows toward the compressor 301. Further, the outdoor heat exchanger 303 serves as a condenser, and the indoor heat exchanger 305 serves as an evaporator.

When the power converter 100 rotationally drives the motor M of the compressor 301, the compression element 301a of the compressor 301, which is coupled to the motor M, compresses the refrigerant, and the compressor 301 discharges high-temperature and high-pressure refrigerant. The high-temperature and high-pressure refrigerant discharged from the compressor 301 passes through the flow switching device 302 to flow into the outdoor heat exchanger 303, and exchanges heat with air outside the outdoor heat exchanger 303 to reject heat. The refrigerant flowing out from the outdoor heat exchanger 303 is expanded and reduced in pressure by the expansion device 304 to transition to low-temperature and low-pressure two-phase gas-liquid refrigerant. The low-temperature and low-pressure two-phase gas-liquid refrigerant flows into the indoor heat exchanger 305 to exchange heat with air in an air-conditioned space. Thus, the refrigerant is evaporated to transition to low-temperature and low-pressure gas refrigerant to flow out of the indoor heat exchanger 305. The gas refrigerant flowing out of the indoor heat exchanger 305 passes through the flow switching device 302 to be sucked into the compressor 301 to be compressed again. The above-mentioned operation is repeated.

FIG. 9 is an illustration of an example in which the power converter according to one of Embodiments 1 to 3 is applied to the compressor 301 of the air-conditioning apparatus, but the present invention is not limited thereto. The present invention is applicable to, other than the air-conditioning apparatus, a heat pump apparatus, a refrigeration apparatus, or other general refrigeration cycle apparatus.

According to Embodiment 4, similarly to Embodiments 1 to 3, the carrier frequency can be decreased to improve the efficiency as the air-conditioning apparatus. In addition, the air-conditioning apparatus can be formed at low cost, and can be improved in reliability.

Embodiments of the present invention are not limited to the respective embodiments described above, and various modifications may be made thereto. For example, Embodiment 1 is an example of a case in which the set delay phase is set to one power supply period, and the adder 46a adds the switching command value D0 and the control amount at the phase angle that is delayed by one period, but the set delay phase is not limited thereto. The set delay phase can be set as appropriate depending on the delay amount caused by the circuit configuration. Further, when the input of the current deviation and the output of the control amount are performed at the same timing in the same integrator $m_0$ to $m_{n-1}$, the control amount may be stored in a buffer (not shown) when the accumulation of the current deviation is completed so that the control amount may be output from the buffer.

The invention claimed is:

1. A power converter, comprising:
a rectifier configured to rectify three-phase AC power;
a transformation circuit including a reactor, a switching element, and a backflow prevention element, and configured to transform a voltage rectified in the rectifier;
a capacitor configured to smooth an output voltage of the transformation circuit;
a power supply voltage detector configured to detect a line voltage or phase voltage of at least one phase of the three-phase AC power;
a current detector configured to detect a reactor current flowing through the reactor;
an output voltage detector configured to detect the output voltage output from the transformation circuit; and
a converter control unit configured to control the switching element of the transformation circuit based on the line voltage or phase voltage detected by the power supply voltage detector, and on the reactor current detected by the current detector,
the converter control unit including
a current control unit configured to calculate a current command value based on the output voltage detected by the output voltage detector;
a current subtractor configured to calculate a current deviation between the current command value calculated in the current control unit and the reactor current,
a switching command value control unit configured to calculate a switching command value from the current deviation calculated in the current subtractor,
a current deviation accumulation unit configured to generate a control amount obtained by integrating the current deviation calculated in the current subtractor for each of different power supply phase angles, and including a plurality of integrators provided for the respective different power supply phase angles of a power supply voltage,
a phase angle calculation unit configured to calculate a power supply phase angle based on the line voltage or the phase voltage detected by the power supply voltage detector,
an input selection unit configured to cause one of the plurality of integrators, which corresponds to the power supply phase angle calculated in the phase angle calculation unit, to accumulate the current deviation,
an output selection unit configured to cause one of the plurality of integrators, which corresponds to a phase angle that is advanced by a set delay phase from the power supply phase angle calculated in the phase angle calculation unit, to output the control amount, and a switching control unit configured to generate a switching signal to be output to the switching element with use of the control amount caused to be output by the output selection unit and the switching command value.

2. The power converter of claim 1, wherein the output selection unit is configured to cause one of the plurality of integrators, which corresponds to a phase angle that is advanced by one period of the power supply voltage as the set delay phase, to output the control amount.

3. The power converter of claim 1, wherein the output selection unit is configured to select one of the plurality of integrators that is caused to output the control amount at a timing that is advanced by two control periods from a control period of the one of the plurality of integrators selected by the input selection unit.

4. The power converter of claim 1, wherein a number of the plurality of integrators is set based on a period of the power supply voltage and a control period.

5. The power converter of claim 1, wherein the current control unit is configured to perform control using any of proportional control, integral control, and derivative control.

6. The power converter of claim 1, wherein the switching command value control unit is configured to perform control using any of proportional control, integral control, and derivative control.

7. The power converter of claim 1, wherein the transformation circuit is a step-up converter including the reactor connected to an output terminal of the rectifier, the backflow prevention element connected to the reactor in series, and the switching element connected between the backflow prevention element and the reactor.

8. The power converter of claim 1, wherein the transformation circuit is a multilevel converter including the reactor connected to an output terminal of the rectifier, two backflow prevention elements connected to the reactor in series, two switching elements connected between the backflow prevention element and the reactor, and an intermediate capacitor connected between the two backflow prevention elements and between the two switching elements.

9. The power converter of claim 8, further comprising an intermediate voltage detector configured to detect a voltage of the intermediate capacitor as an intermediate voltage, wherein the converter control unit further includes an intermediate command value control unit configured to calculate an intermediate switching command value based on the intermediate voltage detected by the intermediate voltage detector.

10. The power converter of claim 1 wherein the transformation circuit is a step-down converter including the switching element connected to an output terminal of the rectifier, the reactor connected to the switching element in series, and the backflow prevention element connected between the switching element and the reactor.

11. An air-conditioning apparatus, comprising:
the power converter of claim 1; and
a refrigerant circuit in which a compressor to which power is to be supplied from the power converter, a condenser, an expansion device, and an evaporator are connected by a refrigerant pipe.

* * * * *